US006778891B2

(12) United States Patent
Tanaka et al.

(10) Patent No.: US 6,778,891 B2
(45) Date of Patent: Aug. 17, 2004

(54) PARKING ASSISTANCE DEVICE AND METHOD USED THEREFOR

(75) Inventors: Yuu Tanaka, Aichi-ken (JP); Yoshifumi Iwata, Anjo (JP); Toshiyasu Katsuno, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/255,622

(22) Filed: Sep. 27, 2002

(65) Prior Publication Data

US 2003/0078713 A1 Apr. 24, 2003

(30) Foreign Application Priority Data

Sep. 28, 2001 (JP) ........................................ 2001-302279

(51) Int. Cl.[7] .............................. G06F 7/00; B60S 9/00; G06G 1/14
(52) U.S. Cl. ...................... 701/41; 340/932.2; 180/204; 180/446
(58) Field of Search .............................. 701/41, 36, 64; 340/425.5, 932.2; 180/204, 446, 199, 167; 318/587

(56) References Cited

U.S. PATENT DOCUMENTS

| | | | | |
|---|---|---|---|---|
| 4,931,930 A | * | 6/1990 | Shyu et al. ................. 701/36 |
| 5,135,069 A | | 8/1992 | Hattori et al. |
| 5,742,141 A | * | 4/1998 | Czekaj .................... 318/587 |
| 5,764,015 A | * | 6/1998 | Shimizu et al. ............. 318/587 |
| 6,070,684 A | * | 6/2000 | Shimizu et al. ............. 180/204 |
| 6,102,147 A | * | 8/2000 | Shimizu et al. ............. 180/204 |
| 6,424,895 B1 | * | 7/2002 | Shimizu et al. ............... 701/41 |

FOREIGN PATENT DOCUMENTS

| | | |
|---|---|---|
| EP | 1 102 226 A2 | 5/2001 |
| EP | 1 123 844 A1 | 8/2001 |
| JP | 59-114139 A | 7/1984 |
| JP | 3-74256 A | 3/1991 |
| JP | 4-55168 A | 2/1992 |

* cited by examiner

Primary Examiner—Thomas G. Black
Assistant Examiner—Ronnie Mancho
(74) Attorney, Agent, or Firm—Burns, Doane, Swecker & Mathis, L.L.P.

(57) ABSTRACT

A parking assistance device capable of performing an easy operation for parking a driver's own vehicle along a parking course up to a parking target position. A parking course in which the driver's own vehicle reaches a parking target position indicated by a marker of a screen of a display of the driver's own vehicle is calculated up (S16). If a steering operation of the driver's own vehicle is performed, in the case that the current rudder angle changes towards a target rudder angle in order to move the driver's own vehicle along a parking course, the steering assistant power of the driver's own vehicle is increased (S21) and thus the steering operation of the driver's own vehicle is performed by a relatively small operational power. On the other hand, if the current rudder angle changes away from the target rudder angle, the steering operation of the driver's own vehicle is performed by a relatively large operational power since the rudder supplementary power is decreased (S21).

19 Claims, 9 Drawing Sheets

F I G. 2
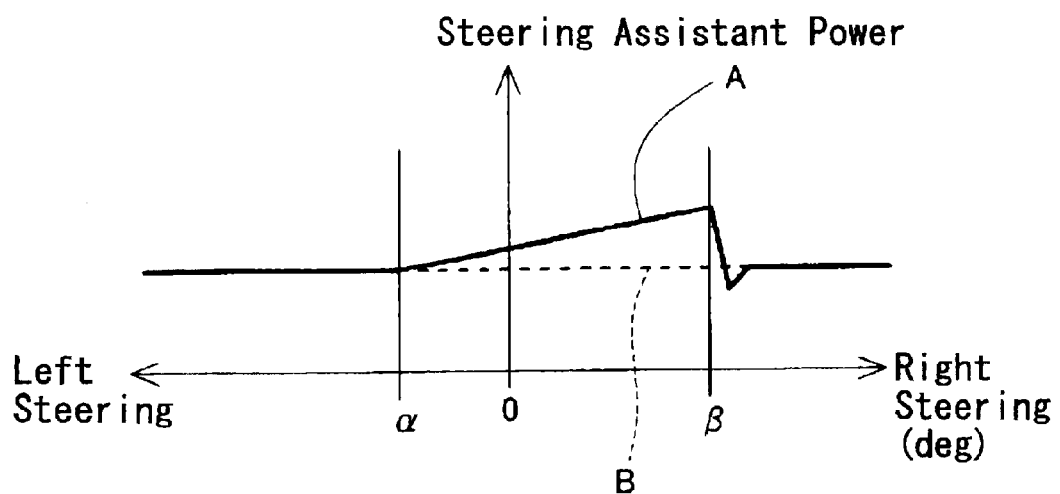
F I G. 3
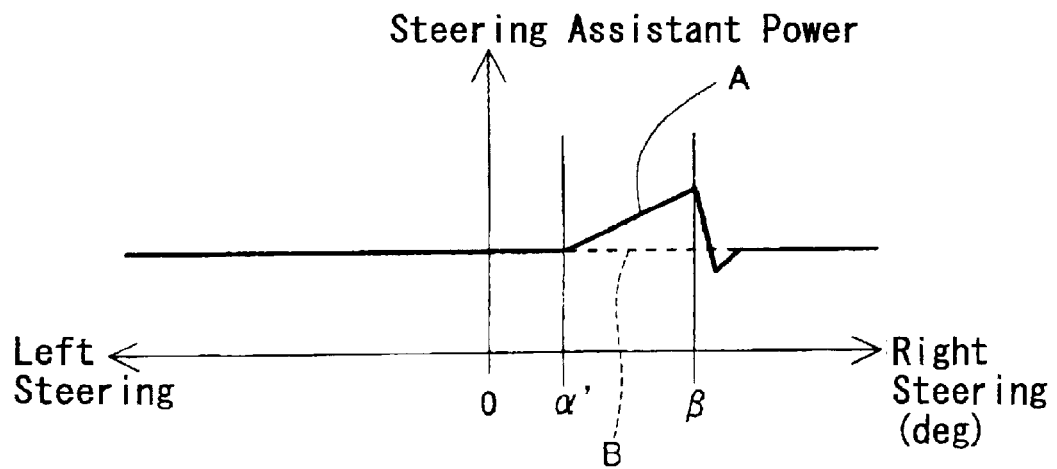

PARKING ASSISTANCE DEVICE AND METHOD USED THEREFOR

CROSS REFERENCE TO RELATED APPLICATIONS

This application is based on and claims priority under 35 U.S.C. §119 with respect to Japanese Application 2001-302279, filed on Sep. 28, 2001, the entire content of which is incorporated herein by reference.

BACKGROUND OF THE INVENTION

1. Field of the Invention

This invention generally relates to a parking assistance device and a method for assisting a parking operation by controlling the steering assistant power.

2. Description of the Related Art

Conventionally, as a parking assistance device, "a backward monitoring device of a vehicle" is disclosed in a Japanese Patent Laid-Open Publication No. SHO. 59-114139, for example, which assists a parking operation using an image displayed on a screen. Namely, in such "a backward monitoring device of a vehicle," marker position data corresponding to operational steering angle data of a vehicle tire are stored in advance, with regard to the backward direction of a driver's own vehicle, marker position data corresponding to the operational steering angle data are retrieved and displayed on the screen of a monitor television that monitors the backward view of the driver's own vehicle as a marker line in a duplicated way if the operational steering angle data are input from a tire directional sensor. Therefore, a marker, which is biased along a predicted backward trail of the driver's own vehicle, as well as an obstacle is displayed on the screen of the monitor television nearby a seat of the driver's own vehicle and the back ward direction of the driver's own vehicle is clearly indicated, thus the load of such a parking operation as putting the vehicle into the garage and column parking can be reduced.

Further, as "a vehicle electrical power steering device and an automatic operational device" disclosed in a Japanese Patent Laid-Open Publication No. HEI. 3-74256 and "steering device and an automatic steering system" disclosed in a Japanese Patent Laid-Open Publication No. HEI. 4-55168, the load of the parking operation such as putting the vehicle into the garage and column parking can be reduced by controlling steering automatically.

However, in "a backward monitoring device of a vehicle" disclosed in the Japanese Patent Laid-Open Publication No. SHO. 59-114139, although marker, which is biased along the predicted backward trail of the driver's own vehicle, as well as the obstacle is displayed on the screen of the monitor television nearby a seat of the driver's own vehicle, the parking operation of the driver's own vehicle along the predicted backward trail should be performed in the same way as a conventional parking operation. Thus, a problem in which the parking operation is influenced by a steering skill of a driver arises.

In "a vehicle electrical power steering device and an automatic operational device" disclosed in the Japanese Patent Laid-Open Publication No. HEI. 3-74256 and "steering device and an automatic steering system" disclosed in the Japanese Patent Laid-Open Publication No. HEI. 4-55168, although the parking operation of the driver's own vehicle can be performed by controlling steering automatically, a problem, in which an avoidance operation to a sudden situation, for example, is delayed, has existed.

For such a problem, although a consideration can be applied to such a sudden situation by releasing automatically a steering automatic control under a prescribed condition, in the case of the automatic steering control, a careless operation such as releasing a hand from steering is easily performed and thus a possibility in which an avoidance operation to a sudden situation is delayed surely exists.

SUMMARY OF THE INVENTION

Therefore, the present invention is made in order to solve the above-mentioned problem. The primary object, of the present invention is to provide a parking assistance device capable of parking the driver's own vehicle easily along the parking course up to the parking target position.

Further, the secondary object of the present invention is to provide the steering operation for parking the vehicle which can be performed easily and further can manage the sudden situation at the time of performing a parking operation.

The present invention is a parking assistance device for calculating a parking course in which a driver's own vehicle reaches a parking target position based on an image picturing a circumstantial view of the driver's own vehicle, in which steering assistant power is increased if an operational steering angle changes towards a target rudder angle in order to move the driver's own vehicle along the parking course and steering assistant power is decreased if an operational steering angle changes away from a target rudder angle.

BRIEF DESCRIPTION OF THE DRAWING

The foregoing and additional features and characteristics of the present invention will become more apparent from the following detailed description considered with reference to the accompanying drawing figures wherein:

FIG. 2 exemplifies control of increasing and/or decreasing steering assistant power of the parking assistance device of the present invention;

FIG. 3 exemplifies control of increasing and/or decreasing steering assistant power of the parking assistance device of the present invention;

DESCRIPTION OF THE PREFERRED EMBODIMENTS

The embodiment of the present invention is explained hereinafter with reference to drawings.

Figure 8:
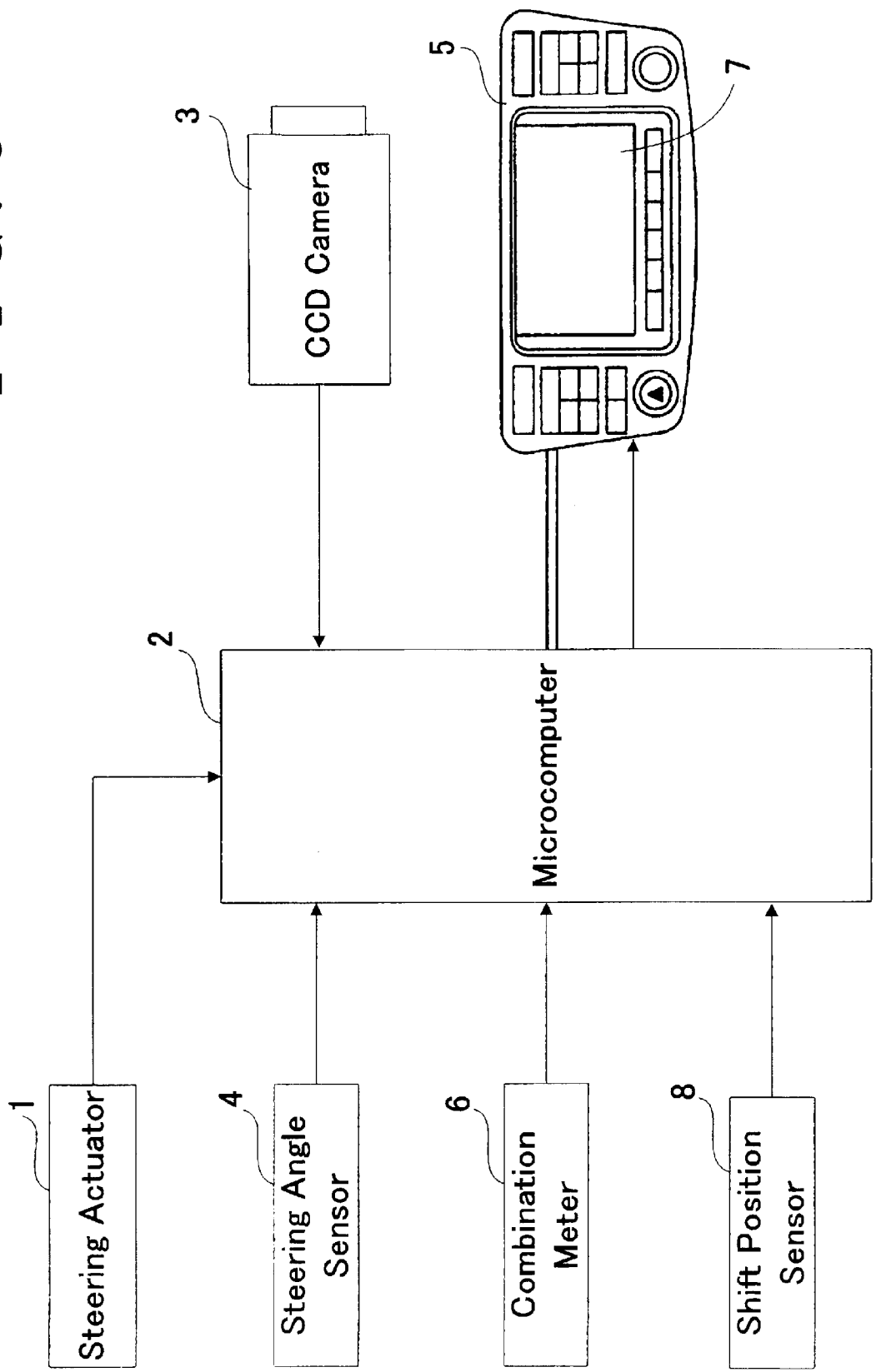
FIG. 8 is a block diagram of the parking assistance device of the present invention.
Figure 9:
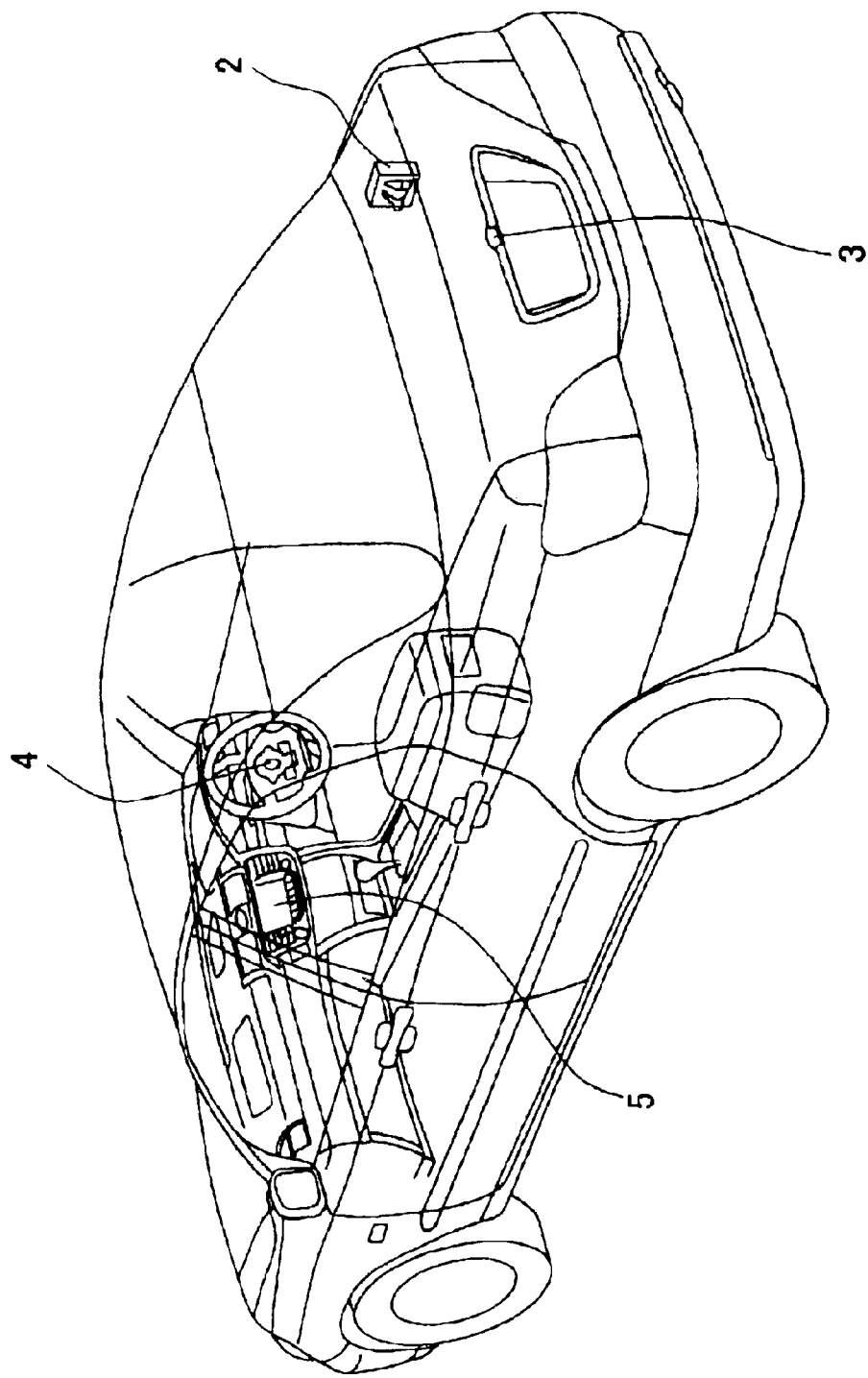
FIG. 9 is a perspective view of a vehicle equipping the parking assistance device of the present invention.

In the following, the embodiment of the present invention is explained with reference to drawings. FIG. 8 is a block diagram of a parking assistance device of one embodiment of the present embodiment. Further, FIG. 9 is a perspective view of a vehicle which equips a parking assistance device of the present invention. As shown in FIG. 8 and FIG. 9, the parking assistance device of the present embodiment is structured by a steering actuator 1, a microcomputer 2, a CCD camera 3, a steering angle sensor 4, a display 5, a combination meter 6, a shift position sensor 8, and so forth.

Further, the steering actuator 1 is used to output force (hereinafter, refer to "steering assistant power") for reducing the power of turning steering.

Further, the microcomputer 2 turns ON and OFF the CCD camera 3. At the same time, the microcomputer 2 displays an image signal from the CCD camera 3 on the display 5. Further, the microcomputer 2 performs the flowcharts of FIG. 1 and FIG. 12.

Further, the CCD camera 3 is installed in the rear part of the vehicle, converts the picture image photographed by a ultra wide angle lens into the image signal and then outputs it to the microcomputer 2. Accordingly, the image output to the microcomputer 2 is inverted so as to display on the display 5 which will have the same image as seeing backward through a room mirror.

Further, the steering angle sensor 4 is installed in a steering wheel and detects a steering angle. Further, the detected steering angle is output to the microcomputer 2 as a steering angle signal.

Further, the display 5 displays the images, etc., photographed by the CCD camera 3 on a screen 7 by way of the microcomputer 2. The screen 7 includes a touch panel.

Further, the combination meter 6 is to detect a vehicle speed. Then, the detected vehicle speed is output to the microcomputer 2 as a vehicle speed signal.

Further, the shift position sensor 8 is to detect the shift position of a transmission. Then, the detected shift position is output to the microcomputer 2 as a shift position signal.

Figure 4:
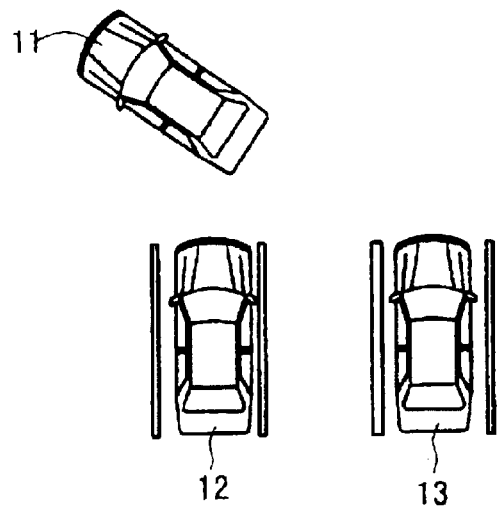
FIG. 4 exemplifies circumstantial conditions of the driver's own vehicle when the parking assistance device of the present invention is used in the case of a parallel parking by a backward operation.

Then, the operation and function of parking assistance device of the present embodiment is explained with reference to the flowchart of FIG. 1. As indicated in FIG. 4, explanation is herein made using parallel parking in which a driver's own vehicle 11 is parked in a space between a one-side parking vehicle 12 and another side parking vehicle 13. First of all, the parking assistance device of the present embodiment, at a step S11 of FIG. 1, judges whether or not the shift position of the transmission is reverse. Concretely, a decision is made based on a shift position signal from the shift position sensor 8 (refer to FIG. 8). In the case of not judging that the shift position of the transmission is reverse (S11: No), the S11 is backed, and the above-mentioned decision is repeated.

Figure 5:
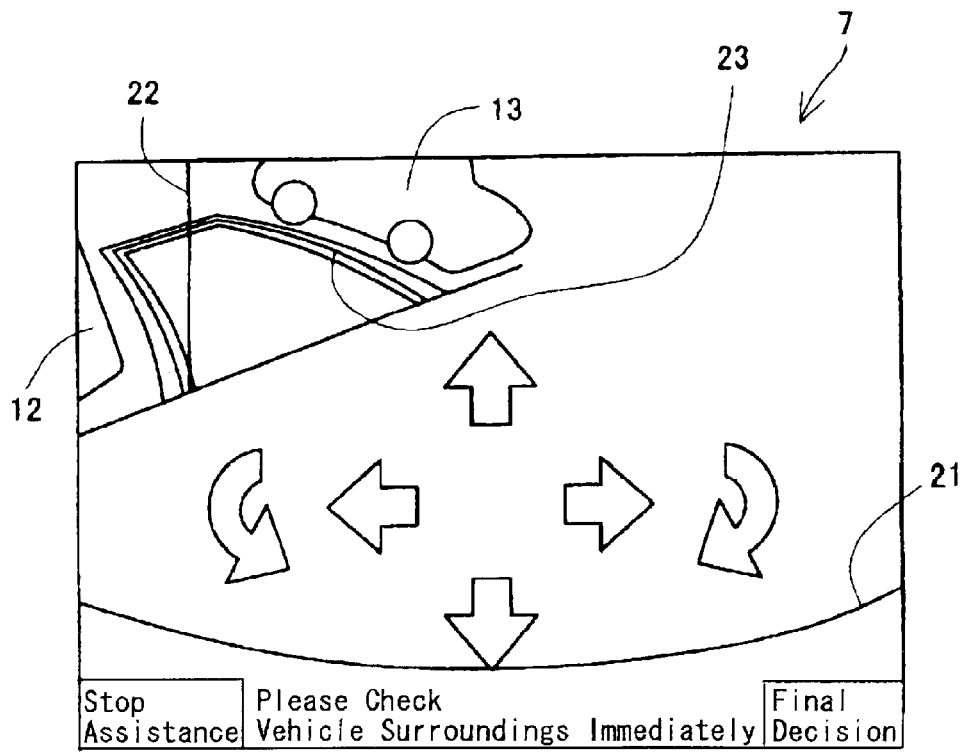
FIG. 5 exemplifies a screen of a display in the parking assistance device of the present invention.

On the other hand, in the case of judging that the shift position of the transmission is reverse (S11: Yes), a step S12 is performed. Then, the image in the backward direction of the driver's own vehicle photographed by the CCD camera 3 is displayed, as indicated in FIG. 5, on the screen 7 of the display 5 of the driver's own vehicle 11 of FIG. 4 (refer to FIG. 8). Concretely, a bumper rear end 21 of the driver's own vehicle, the one-side parking vehicle 12, a rear parking vehicle 13, and so forth are displayed on the screen 7 of the display 5. A marker 22 of an avoidance point is displayed using a vertical line on the screen 7 of the display 5, and also a marker 23 as a parking target position is displayed using a frame. The marker 22 of the avoidance point and the marker 23 as the parking target position can be moved by touching a white arrow except inside which is displayed on the screen 7 as the touch panel. Accordingly, the avoidance point and the parking target position can be set using the screen 7 of the display 5.

Figure 1:
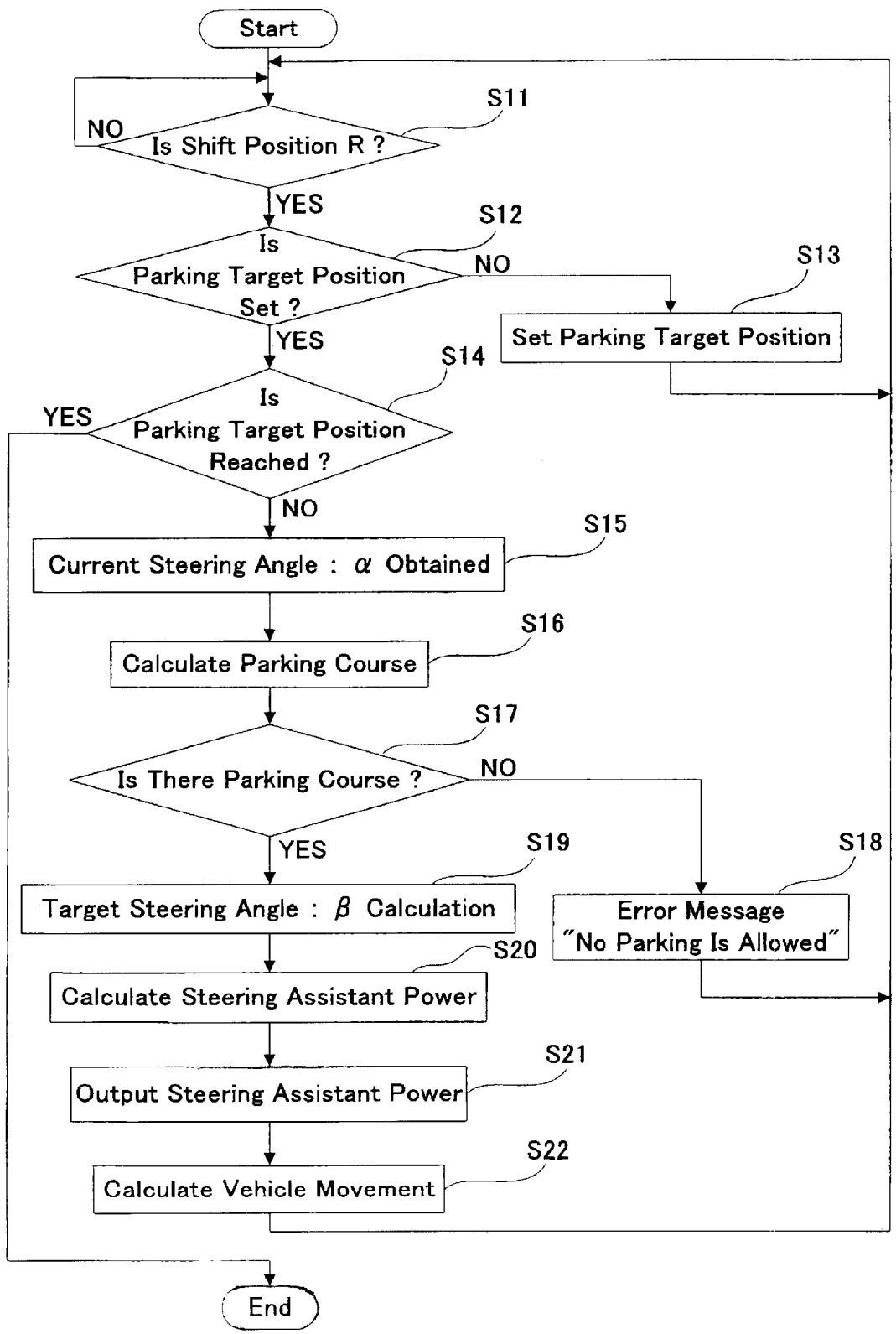
FIG. 1 is a flowchart of a parking assistance device of the present invention.

At the step S12 of FIG. 1, it is judged whether or not the target position is set. At this judgment, if it is not judged that the parking target position has been set (S12: No), a step S13 is performed and then the parking target position is set. Concretely, as explained in the above-mentioned description, the operation is performed by touching the screen 7 of the display 5 (refer to FIGS. 5 and 8). Then, the step S11 is performed back and the above-mentioned judgment is repeated thereafter.

On the other hand, if it is judged that the parking target position has been set (S12: Yes), a step S14 is performed forward, and then it is judged whether or not the parking target position has been reached. Specifically, it is judged whether or not the driver's own vehicle 11 of FIG. 4 exists in a space designated by the marker 23 as the parking target position of FIG. 5. If it is judged that the parking target position has been reached (S14: Yes), the flowchart of FIG. 1 is terminated. If it is not judged that the parking target position has been reached (S14: No), a step S15 is performed forward.

At the step S15, a current rudder angle α (equivalent to an "operational steering angle") is obtained. Concretely, it is obtained through a steering angle signal from the steering angle sensor 4 (refer to FIG. 8). Then, at a step S16, a parking course is calculated up to the parking target position from the current position. Specifically, the parking course up to the point of the space indicated by the marker 23 as the parking target position of FIG. 5 from the current position of the driver's own vehicle 11 of FIG. 4 is calculated. At this calculation, the escape of the avoidance point indicated by the marker 22 of FIG. 5 is considered.

Figure 7:
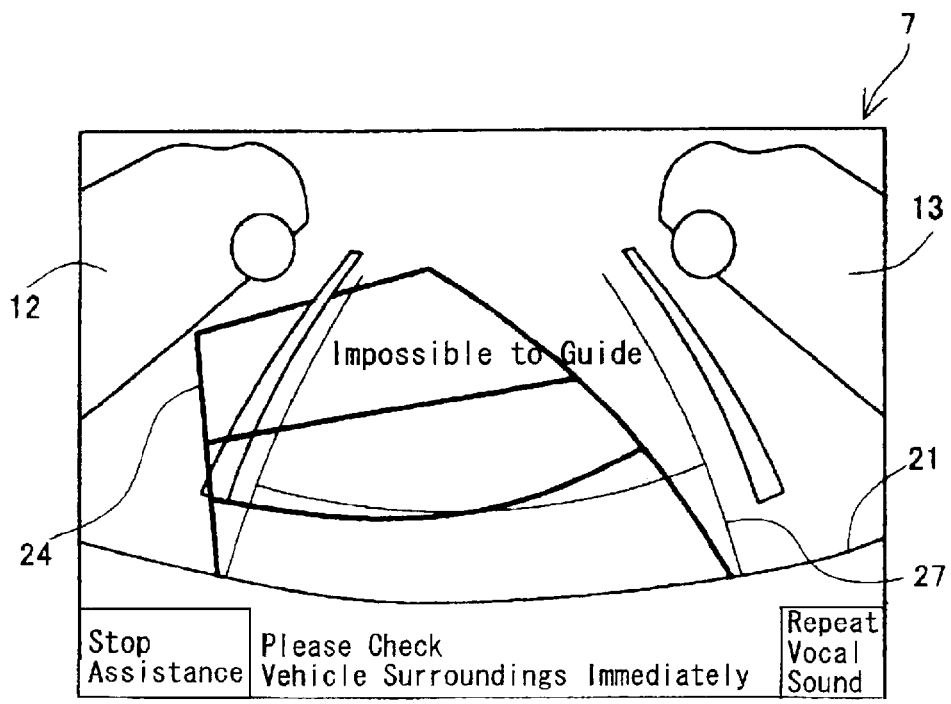
FIG. 7 exemplifies a screen of a display in the parking assistance device of the present invention.

Then, it is judged whether or not the parking course exists at a step S17. At this step, if it is judged that the parking course does not exist (S17: No), a step S18 is performed forward, and then error information is displayed. For example, as shown in FIG. 7, the characteristic expression of "IMPOSSIBLE TO GUIDE" is displayed on the screen 7 of the display 5 (refer to FIG. 8). On the other hand, if it is judged that the parking course exists (S17: Yes), a step S19 is performed forward, and then a target rudder angle β is calculated so as to trail the parking course.

Then, at a step S20, after necessary "supplemental power" has been calculated from the current rudder angle α and the target rudder angle β, at a step S21, this "supplemental power" is output. At this stage, as indicated by a solid line A of FIG. 2 and FIG. 3, for example, an operation is performed so as to reduce the load of steering by increasing the "steering assistant power" output from the steering actuator 1 as the current rudder angles α and α' approach to the target rudder angle β. If the current rudder angles α and α' exceed the target rudder angle β, an operation is performed so as to increase the load of steering by decreasing the "steering assistant powers" output from the steering actuator 1. Specifically, dotted lines B of FIGS. 2 and 3 indicate the "supplemental power of the rudder angle" output by the steering actuator 1 at the time of performing a normal operation.

Figure 6:
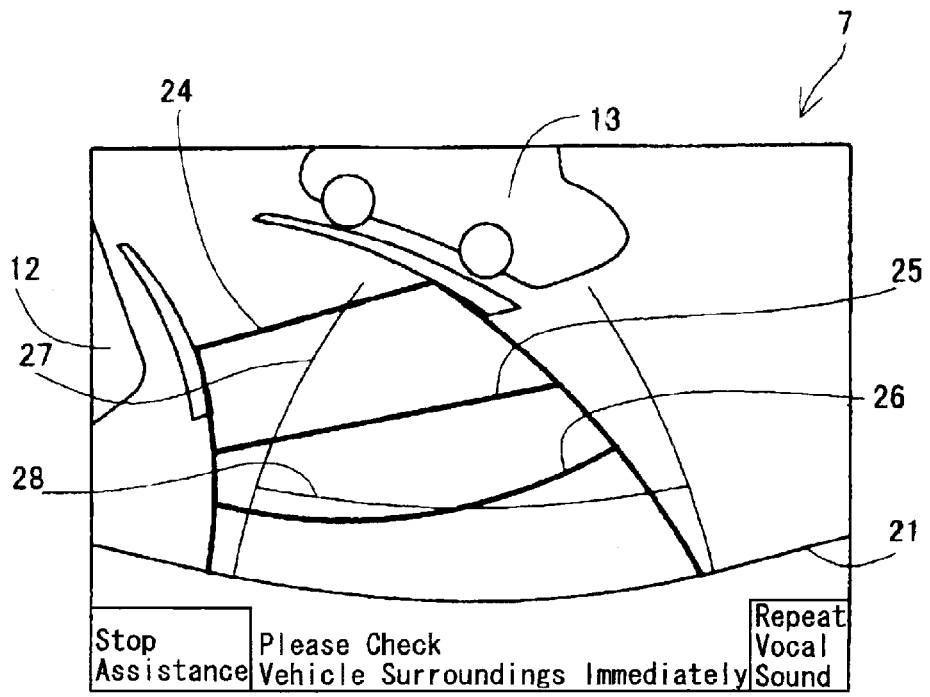
FIG. 6 exemplifies a screen of a display in the parking assistance device of the present invention.

Further, at a step S22, the migration locus of the driver's own vehicle is calculated and the current position is obtained. To give an actual example, based on the current rudder angle obtained by the steering angle signal from the steering angle sensor 4 and a vehicle speed obtained by a vehicle speed signal from the combination meter 6, a migration locus of the driver's own vehicle is calculated. Then, as shown in FIG. 6, the rear image of the driver's own vehicle photographed by the CCD camera 3 is monitored on the screen 7 of the display 5. At the same time, a forecasted course line 24 calculated from the current steering angle, distance measurement lines 25 and 26 in connection with steering, a vehicle width extension line 27, a distance measurement line 28 and so forth are displayed in a duplicated way. Specifically, after the step S22 is processed, the step S11 is performed back, and the above-mentioned process is repeated.

As explained in the above-mentioned description, in the parking assistance device of the present embodiment, the parking course up to the time that the driver's own vehicle 11 reaches the parking target position indicated by the marker 23 of the screen 7 of the display 5 is calculated (S16). If a steering operation of the driver's own vehicle 11 is performed, as indicated by a solid lines A of FIGS. 2 and 3, in the case that the current rudder angles $\alpha$ and $\alpha'$ change towards the target rudder angle $\beta$ in order to move the driver's own vehicle 11 along the course of the vehicle, the steering operation of the driver's own vehicle 11 is performed by relatively small operational power since the "steering assistant power" of the driver's own vehicle 11 is increased (S21). On the other hand, in the case that the current rudder angles $\alpha$ and $\alpha'$ change away from the target rudder angle $\beta$, the steering operation of the driver's own vehicle 11 should be performed using relatively large operation power since the "steering assistant power" of the driver's own vehicle 11 is decreased (S21).

Namely, in the parking assistance device of the present embodiment, as indicated by the solid lines A of FIGS. 2 and 3, in the case that the current rudder angles $\alpha$ and $\alpha'$ change towards the target rudder angle $\beta$ in order to move the driver's own vehicle 11 along the course of the vehicle, the "steering assistant power" of the driver's own vehicle 11 can be operated by relatively small operational power. On the other hand, in the case that the current rudder $\alpha$ and $\alpha'$ change away from the target rudder angle $\beta$, the steering operation of the driver's own vehicle 11 should be performed by relatively large operation power. Since it is possible to judge based on the operational power whether the steering operation of the driver's own vehicle 11 changes towards the target rudder angle $\beta$ or whether the steering operation of the driver's own vehicle 11 changes away from the target rudder angle $\beta$, the operation of parking the driver's own vehicle 11 along the parking course up to the parking target position can be achieved easily.

Further, in the parking assistance device of the present embodiment, as indicated by the solid lines A of FIGS. 2 and 3, in the case that the current rudder $\alpha$ and $\alpha'$ change away from the target rudder angle $\beta$ in order to move the driver's own vehicle 11 along the course of the vehicle, it is possible to move stably the driver's own vehicle 11 along the parking course since the "steering assistant bower" of the driver's own vehicle 11 should be operated by relatively large operational power.

The present invention is not limited to the above-mentioned embodiment, but various modifications can be possible within the scope of the subject matter.

Figure 10:
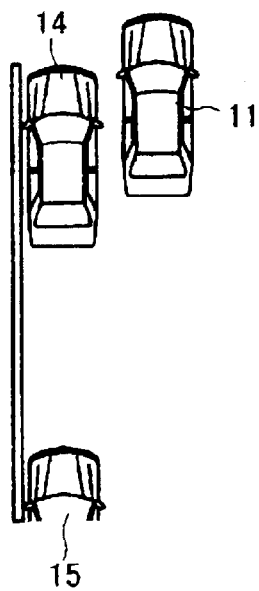
FIG. 10 exemplifies circumstantial conditions of the driver's own vehicle when the parking assistance device of the present invention is used in the case of a cascaded parking by a backward operation.
Figure 11:
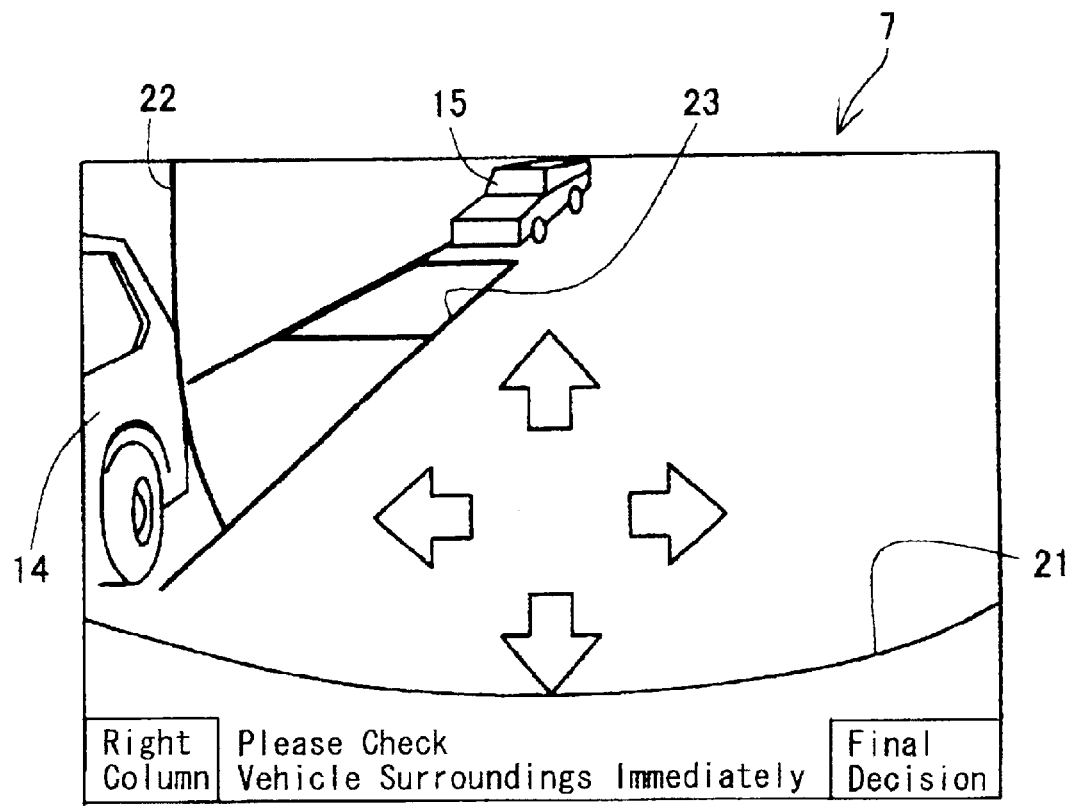
FIG. 11 exemplifies a screen of a display in the parking assistance device of the present invention.

For example, in the parking assistance device of the present embodiment, as shown in FIG. 4, although the case of parallel parking in which the driver's own vehicle 11 is parked between the one-side parking vehicle 12 and another side parking vehicle 13 is explained, as shown in FIG. 10, it is possible to park the driver's own vehicle 11 in a space between a forward parking vehicle 14 and a backward parking vehicle 15. In this case, the backward image photographed by the CCD camera 3 of the driver's own vehicle is displayed, as shown in FIG. 11, on the screen 7 of the display 5 of the driver's own vehicle 11 of FIG. 10. Concretely, the bumper rear end 21 of the driver's own vehicle, the forward parking vehicle 14, the backward parking vehicle 15 and so forth are displayed on the screen 7 of the display 5. Further, the marker 23 of the parking target position is displayed using the frame as well as the marker 22 of the avoidance point is indicated using a vertical line on the screen 7 of the display 5. In this case, the marker 22 of the avoidance point and the marker 23 as the parking target position can be moved by touching the white arrow except inside displayed on the screen 7 as the touch panel. Accordingly, the avoidance point or the parking target position can be set on the screen 7 of the display 5.

Figure 12:
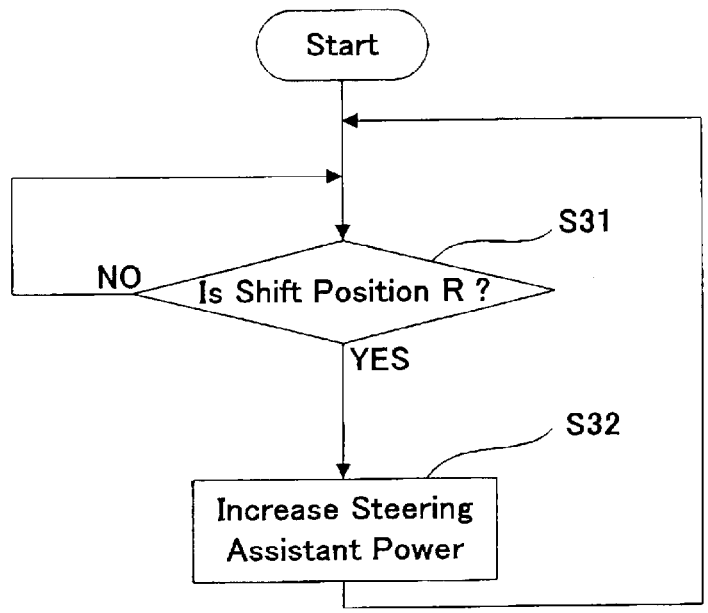
FIG. 12 is a flowchart of the parking assistance device of the present invention.

Further, the present parking assistance device of the present embodiment can be performed based on the flowchart of FIG. 12 without using the flowchart of FIG. 1. Namely, first of all, at the step S31 of FIG. 12, it is judged whether or not the shift position of the transmission is reverse. Concretely, the decision is made based on the shift position signal from the shift position sensor 8 (refer to FIG. 8). At this stage, if it is not judged that the shift position of the transmission is reverse (S31: No), the step S31 is performed back, and the above-mentioned judgment is repeated.

On the other hand, if it is judged that the shift position of the transmission is reverse (S31: Yes), a step S32 is performed, the "steering assistant power" output from the steering actuator 1 is increased uniformly without having any relation with the current rudder angle as indicated by the solid line A of FIG. 13, for example. Otherwise, the "steering assistant power" output from the steering actuator 1 is increased in proportion to the operational speed of steering as indicated by the solid line A of FIG. 14. At this operation, the operational speed of steering can be obtained by a steering angle signal from the steering angle sensor 4 (refer to FIG. 8). Further, if the shift position of the transmission is not reverse, the "steering assistant power" output from steering actuator 1 becomes normal as indicated by the dotted lines B of FIGS. 13 and 14. Then, after the step S32 has been processed, the step S31 is performed back and the above-mentioned process is repeated.

Specifically, if the parking assistance device of the present embodiment is performed based on the flowchart of FIG. 12, at the step S31, it is judged whether the operation of parking the driver's own vehicle 11 is started or whether the operation of parking the driver's own vehicle 11 is ended by judging whether or not the shift position of the transmission is reverse. Then, if it is judged that the shift position of the transmission is reverse (S31: Yes), it is judged that the operation of parking the driver's own vehicle 11 is started. At the step S32, as indicated by the solid lines A of FIGS. 13 and 14, the load of the steering operation is decreased at the time of performing the parking operation by increasing the "steering assistant power" of the driver's own vehicle 11.

Figure 13:
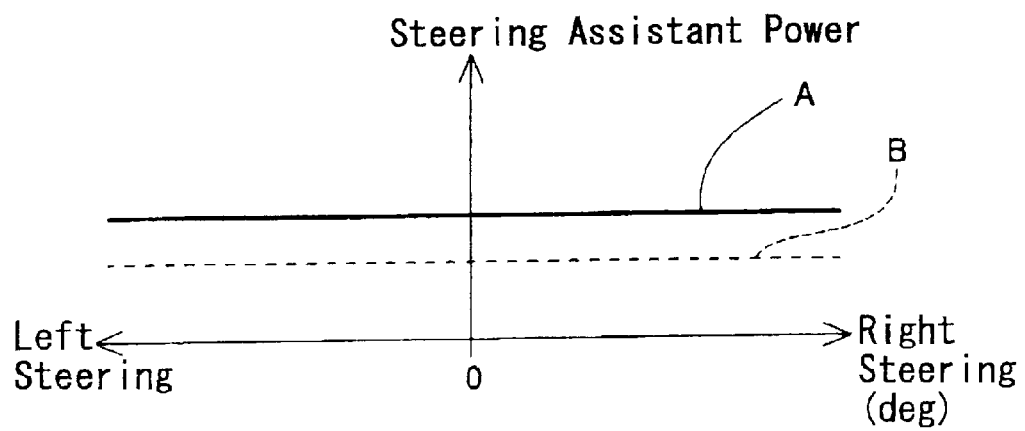
FIG. 13 exemplifies control of increasing and/or decreasing steering assistant power of the parking assistance device of the present invention.
Figure 14:
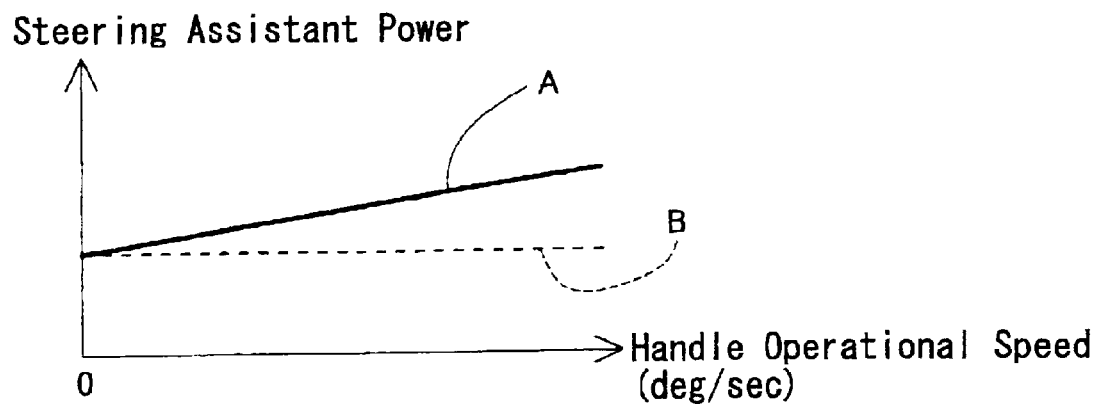
FIG. 14 exemplifies control of increasing and/or decreasing steering assistant power of the parking assistance device of the present invention.

On the other hand, if the shift position of the transmission is not reverse, as indicated by the dotted lines B of FIGS. 13 and 14, the "steering assistant power" output from the steering actuator 1 is defined as a normal and the steering operation at the time of non-parking is necessarily performed using normal operational power, thus the steering operation at the time of performing the parking operation can be easier. At the parking operation, however, as indicated by the solid lines A of FIGS. 13 and 14, although the steering operation can be performed using relatively small operational power by increasing the "steering assistant power" of the driver's own vehicle 11, the steering operation is performed manually and thus the steering operation cannot be performed without a manual operation. Accordingly this manual operation enables the driver of the vehicle to manage a sudden situation securely at the time of performing the parking operation.

According to the parking assistance device of the present invention, in the case that the operational steering angle changes towards the target rudder angle in order for the driver's own vehicle to move along the parking course, steering of the driver's own vehicle can be performed using relatively small operational power. On the other hand, in the case that the operational steering angle changes away from the target rudder angle, steering of the driver's own vehicle can be performed using relatively large operational power. Therefore, it is possible to judge based on the operational power whether steering of the driver's own vehicle changes towards the target rudder angle or whether steering of the driver's own vehicle changes away from the target rudder angle, thus the operation of parking the driver's own vehicle along the parking course up to the parking target position can be performed easily.

The parking assistance device of the present invention having those features calculates the parking course in which the driver's own vehicle reaches the parking target position based on the image picturing circumstantial views of the driver's own vehicle. For this calculation, if the steering operation of the driver's own vehicle is performed, the steering assistant power of the driver's own vehicle is increased in the case that the operational steering angle changes towards the target steering angle, thus the steering operation of the driver's own vehicle can be performed by relatively small power. On the other hand, in the case that the operational steering angle changes away from the target steering angle, the steering assistant power of the driver's own vehicle is decreased, thus the steering operation of the driver's own vehicle should be performed by relatively large power.

Namely, with regard to the present invention, in the case that the operational steering angle changes towards the target steering angle in order to move the driver's own vehicle along the parking course, the steering operation of the driver's own vehicle can be performed by relatively small operational power. On the other hand, in the case that the operational steering angle changes away from the target steering angle, the steering operation of the driver's own vehicle should be performed by relatively large operational power. In this way, it is possible to judge based on the operational power whether the steering operation of the driver's own vehicle changes towards the target steering angle or whether the steering operation of the driver's own vehicle changes away from the target steering angle, thus the operation of parking the driver's own vehicle along the parking course up to the parking target position can be performed easily.

Further, with regard to the present invention, in the case that the operational steering angle changes away from the target steering angle in order to move the driver's own vehicle along the parking course, the steering operation should be performed by relatively large power, thus it is possible to move stably the driver's own vehicle along the parking course.

The present invention is characterized in that a parking assistance device includes a judgment means for judging whether an operation of parking a driver's own vehicle is started or whether the operation of parking the driver's own vehicle is ended, in which a steering assistant power of the driver's own vehicle is increased if the judgment means determines that the operation of parking the driver's own vehicle is started and the steering assistant power of the driver's own vehicle is caused to be an original power level if the judgment means determines that the operation of parking the driver's own vehicle is ended.

Namely, with regard to the present invention, in the case that the steering assistant power of the driver's own vehicle is increased if the judgment means determines that the operation of parking the driver's own vehicle is started, thus the steering power at the time of performing the parking operation can be performed by relatively small power. On the other hand, the steering assistant power of the driver's own vehicle is caused to be an original power level if the judgment means determines that the operation of parking the driver's own vehicle is ended, thus the steering operation at the time of performing the parking operation should be performed by a usual operational power. Accordingly, the steering operation at the time of performing the parking operation can be performed easily and further, this manual steering operation enables the driver of the vehicle to manage the sudden situation at the time of performing the parking operation although the steering operation can be performed by relatively small operational power by increasing the steering assistant power of the driver's own vehicle.

Further, according to the parking assistance device of the present invention, in the case that the operational steering angle changes away from the target rudder angle in order for the driver's own vehicle to move along the parking course, steering of the driver's own vehicle needs to be performed using relatively large operational power. Therefore, it is possible to move stably the driver's own vehicle along the parking course.

Further, according to the parking assistance device of the present invention, if a judging means has decided that the operation of parking the driver's own vehicle has been started, the steering assistant power of the driver's own vehicle is increased and steering at the time of performing the parking operation can be performed by relatively small operational power. On the other hand, if the judging means has decided that the operation of parking the driver's own vehicle has been ended, the steering assistant power of the driver's own vehicle is caused to be an original power level and steering is necessarily performed using the usual operational power. Thus, steering at the time of performing the parking operation can be made easy. At the same time, although the steering operation can be performed by relatively small operational power by increasing the steering assistant power of the driver's own vehicle at the time of parking operation, this operation is performed manually and thus this manual parking operation enables the driver of the vehicle to manage the sudden situation at the time of performing the parking operation.

What is claimed is:

1. A parking assistance device which assists a driver parking a vehicle by assisting a steering operation of the driver during the parking, the parking assistance device calculating a parking course in which the vehicle reaches a parking target position based on an image picturing a circumstantial view of said vehicle, wherein:

a steering assistant power which assists the steering operation of the driver during parking, is increased if an operational steering angle changes towards a target steering angle in order to move said vehicle along said parking course and said steering assistant power is decreased if the operational steering angle changes away from the target steering angle.

2. The parking assistance device according to claim 1, comprising:
   a steering actuator for outputting the steering assistant power for reducing turning power of a steering wheel;
   a image converting means for converting the image photographed into an image signal;
   a display means for displaying the image photographed by said image converting means;
   a control means for turning ON and OFF said image converting means and displaying said image signal from said image converting means on said display means;
   a steering angle sensor for detecting a steering angle being output to said control means as a steering angle signal; and
   a shift position sensor for detecting a shift position of a transmission being output to said control means as a shift position signal.

3. The parking assistance device according to claim 2, wherein:
   said image signal output to said control means is inverted so as to display the same image as seeing backward on said display means.

4. The parking assistance device according to claim 2, wherein:
   said display means displays an image in a backward direction of the vehicle photographed by said image converting means.

5. The parking assistance device according to claim 4, wherein:
   said image in said backward direction includes a rear end of said vehicle, a marker of an avoidance point by utilizing a vertical line, and a marker as a parking target position.

6. The parking assistance device according to claim 5, wherein:
   said marker of said avoidance point and said marker as said parking target position can be moved by touching a white arrow except inside being displayed so as to set said avoidance point and said parking target position.

7. A parking assistance device which assists a driver's parking operation of a vehicle by assisting a steering operation of the driver during the parking operation, comprising:
   a judgment means for judging whether the parking operation of the vehicle is started and whether said parking operation of said vehicle is ended, wherein:
   steering assistant power which assists the steering operation by the driver during the parking operation of said vehicle is increased if said judgment means determines that said parking operation of said vehicle is started and said steering assistant power of said vehicle is decreased to an original power level if said judgment means determines that said parking operation of said vehicle is ended.

8. The parking assistance device according to claim 7, wherein:
   said steering means includes a function of determining that said parking operation of said vehicle is started only if it is judged that a shift position of a transmission is reverse and that said parking operation of said vehicle is ended only if it is judged that said shift position of said transmission is not reverse.

9. The parking assistance device according to claim 7, wherein:
   said steering assistant power of said vehicle is increased uniformly without having any relation with a current steering angle.

10. The parking assistance device according to claim 7, wherein:
    said steering assistant power of said vehicle is increased in proportion to an operational speed of steering.

11. A method for assisting a driver to park a vehicle by assisting a steering operation of the driver during parking, comprising:
    judging whether or not a shift position of a transmission is reverse;
    if said shift position of said transmission is reverse, then:
    calculating a target steering angle based on a parking target position;
    calculating a steering assistant power, which assists the steering operation by the driver during the parking operation, based on the target steering angle and an operational steering angle in such a manner that the steering assistant power is increased when the operational steering angle changes toward the target steering angle and the steering assistant power is decreased when the operational steering angle changes away from the target steering angle; and
    outputting the calculated steering assistant power.

12. The method according to claim 11, further comprising the steps of:
    performing parking course calculation for calculating a parking course up to a point of a space indicated by a marker as said parking target position from a current position of the vehicle; and
    judging whether or not said parking course exists;
    if said parking course exists, then:
    performing steering assistant power calculation for calculating necessary supplemental power; and
    performing vehicle migration calculation for calculating a migration locus of said vehicle and said current position.

13. The method according to claim 12, wherein:
    said parking course up to said point of said space is calculated by utilizing an operational steering angle obtained through a steering angle signal from a steering angle sensor.

14. The method according to claim 13, wherein:
    said marker can be moved by touching a white arrow except inside being displayed on a screen as a touch panel as an avoidance point and said parking target position.

15. The method according to claim 12, wherein:
    said parking course calculation calculates an escape of an avoidance point indicated by said marker.

16. The method according to claim 12, wherein:
    said necessary supplemental power is calculated by utilizing a current steering angle and a target steering angle.

17. The method according to claim 16, wherein:
    said necessary supplemental power is obtained so as to reduce a load of steering by increasing said steering assistant power output from a steering actuator as the current steering angles approach to a target steering angle.

18. The method according to claim 12, wherein:
    said vehicle migration calculation invokes a displaying procedure for displaying a rear image of said vehicle photographed by a camera.

19. The method according to claim 18, wherein:

said displaying procedure displays a forecasted course line calculated by utilizing a current steering angle, distance measurement lines in connection with steering, a vehicle width extension line, and a distance measurement line in a duplicated way.

* * * * *